(No Model.)
R. M. OLYPHANT, Jr.
SUPPLEMENTAL SEAT FOR BICYCLES.
No. 596,786. Patented Jan. 4, 1898.
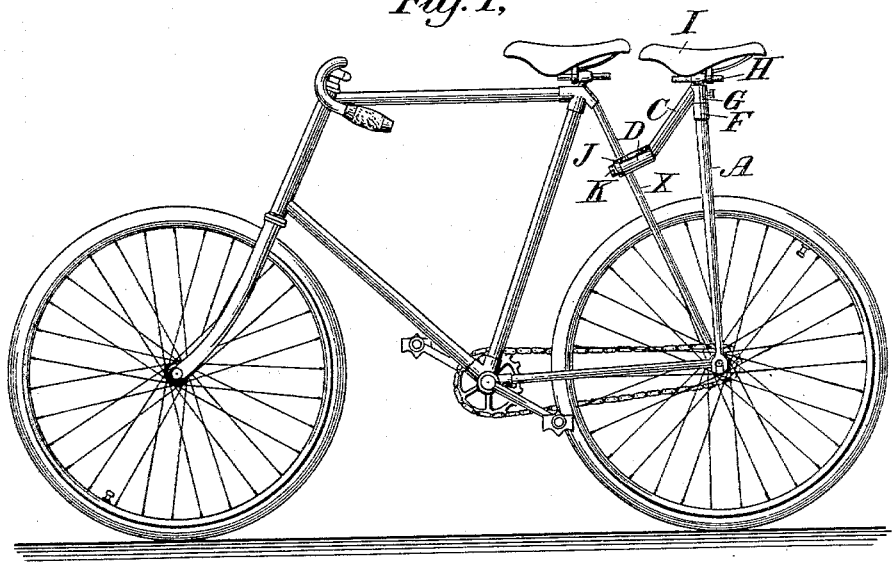
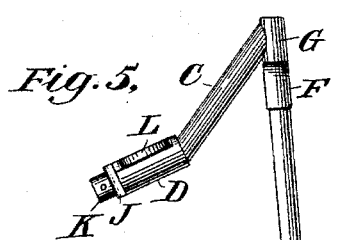
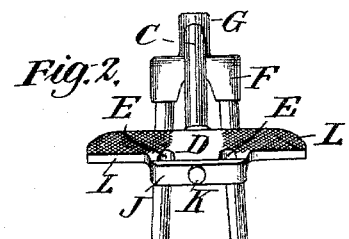
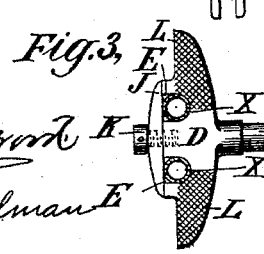
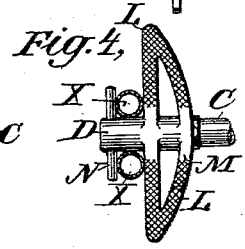
WITNESSES:
INVENTOR
Robert M. Olyphant, Jr,
BY
Betts, Hyde & Betts,
ATTORNEYS.

UNITED STATES PATENT OFFICE.

ROBERT MORRISON OLYPHANT, JR., OF SOUTHAMPTON, NEW YORK.

SUPPLEMENTAL SEAT FOR BICYCLES.

SPECIFICATION forming part of Letters Patent No. 596,786, dated January 4, 1898.

Application filed September 28, 1896. Serial No. 607,185. (No model.)

*To all whom it may concern:*

Be it known that I, ROBERT MORRISON OLYPHANT, Jr., of Southampton, in the county of Suffolk and State of New York, have invented certain new and useful Improvements in Supplemental Seats for Bicycles, of which the following is a full and accurate description, reference being had to the accompanying drawings, in which similar letters refer to like parts in the several figures.

The object of my invention is to provide a supplemental seat having downwardly-extending arms provided with means for fitting upon and engaging the axle or axle extensions of the rear wheel of the bicycle and with a forwardly-extending arm having means for engaging the frame of an ordinary bicycle, the locking means carried by the forwardly-extending arm being complete in itself and adapted to rigidly engage with the bicycle without providing the bicycle with a lock for the purpose and without adjusting or loosening any part thereof or loosening the saddle or saddle-post of the bicycle.

In the accompanying drawings, Figure 1 shows the combination of my improved seat with a safety-bicycle. Fig. 2 is a front view or the supplemental seat. Fig. 3 is a detail view showing the means for locking the attachment to the rear bars of a bicycle. Fig. 4 is a detail view of another form of attaching means, and Fig. 5 is a side view of the attachment of Fig. 2.

Referring to the supplemental seat shown in Fig. 1, A A are downwardly-extending arms provided at their lower ends with forks B or equivalent means for engaging with the axle or axle extensions of the rear wheel of a bicycle. They may, however, engage with projections extending from the bicycle-frame near the said axle. If desired, the forks may be rigidly locked to the axle, axle extensions, or projections; but I prefer the readily-removable seat as a convenient form of my invention.

C is a downwardly and forwardly extending arm, to the free end of which is secured a plate D, which is forked at E E.

A plate F connects the arms A with each other.

G is a tubular saddle-support extending upwardly from plate F and rigidly secured to arm C.

H is a saddle-post, and I an ordinary form of saddle.

A locking-bar J is pivoted to the end of the forked plate D and locked by a nut K. This locking-bar is turned at an angle to the plate D and the forks E fitted to the rear bars X X of the bicycle-frame. The locking-bar is then turned to the position shown in the figure, and the nut K is tightened. As the arms A are held by their forks, this single locking device results in rigidly securing the supplementary seat to the bicycle-frame and renders the whole contrivance easy of attachment and detachment.

The saddle-support is arranged at the junction of the arms A with the arm C, and by reason of the fact that arms A extend rearwardly and arm C extends forwardly the weight of the riders is distributed more evenly between the two wheels than would be the case if the support for the seat rested entirely on the rear axle, as has been heretofore proposed. The locking-plate D may be extended sidewise, and the extensions constituting foot-rests L may have roughened surfaces to prevent slipping.

In the modification illustrated in Fig. 4 the arm C terminates in an eye or ring, and a bar M is rigidly attached to the arm. When fitted to a bicycle, the rear bars X X fit at either side of the arm C, and a pin or bar N is thrust through the eye or ring of the end of the bar. The bar M may be extended, and the extensions may be used as foot-rests.

When my new form of supplemental seat is attached to the rear of a bicycle, two persons may be carried on said machine.

While I have herein shown and described two constructions of supplemental seats which practically embody my invention, I do not desire to be understood as limiting my improvements to such forms, for other forms of supplemental seats will readily suggest themselves to skilled mechanics and will be within my invention.

I am aware that it has been proposed to provide the rear part of a bicycle-frame with a lock adapted to engage the forwardly-extending arm of a supplemental frame which is adapted to engage with and be locked by the lock of the bicycle. This construction, however, necessitates the addition of a lock to the bicycle-frame before the supplemental seat can be attached, while my supplemental seat, carrying a suitable form of lock, can engage with the rear bars of any of the usual forms of bicycles and may be changed from one bicycle to another without the addition of a lock to the bicycle. I am also aware that it has been proposed to secure the forwardly-extending arm of a supplemental seat, said arm not being provided with a lock, into engagement with the clamp which holds the saddle upon the saddle-post. In said construction it is necessary to loosen the saddle before the supplementary seat can be attached or detached, and if the forwardly-extending arm is rigid the saddle-post cannot be adjusted vertically. A supplementary seat made under my invention can, however, be added to any of the ordinary forms of bicycles without loosening the saddle or saddle-post, and the latter may be raised or lowered irrespective of the supplemental frame.

What I claim is—

A supplementary seat for bicycles, comprising a frame having a pair of downwardly-extending arms provided with forked ends and with a forwardly-extending arm, means for sustaining a saddle upon said frame, an enlarged portion near the end of the forwardly-extending arm, said enlarged portion adapted to act as foot-rests and having means for engaging the rear bars of a bicycle, and a locking device carried by said arm, substantially as and for the purpose described.

In witness whereof I have hereunto signed my name this 19th day of September, 1896.

ROBERT MORRISON OLYPHANT, JR.

In presence of—
GEO. S. WEAVER, Jr.,
ROBERT OLYPHANT.